W. F. MOTTIER.
PLUNGER FOR BALING MACHINES.
APPLICATION FILED JULY 24, 1919.
1,411,367.
Patented Apr. 4, 1922.
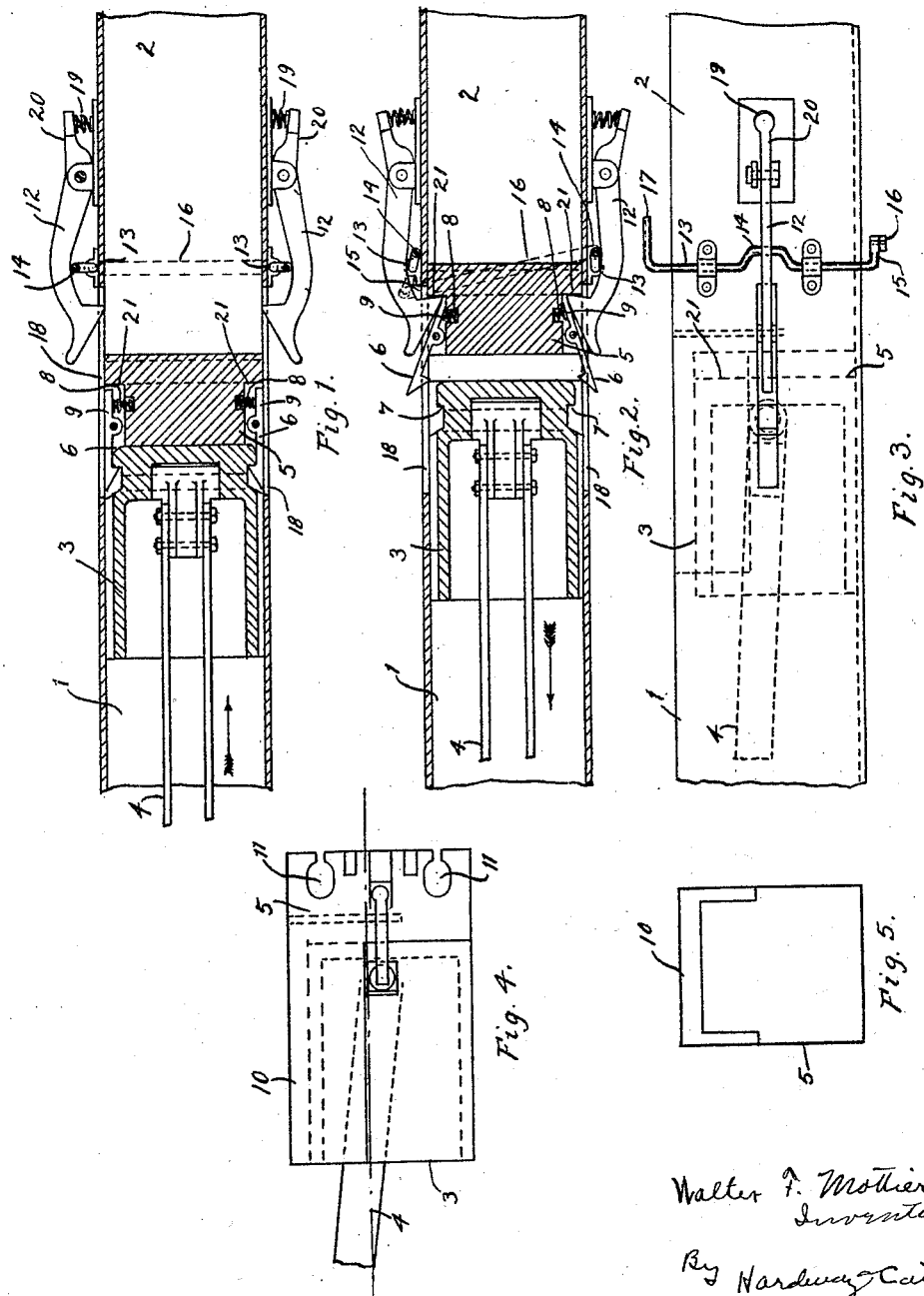

UNITED STATES PATENT OFFICE.

WALTER F. MOTTIER, OF EL CAMPO, TEXAS.

PLUNGER FOR BALING MACHINES.

1,411,367.  Specification of Letters Patent.  Patented Apr. 4, 1922.

Application filed July 24, 1919. Serial No. 313,009.

*To all whom it may concern:*

Be it known that WALTER F. MOTTIER, a citizen of the United States, residing at El Campo, in the county of Wharton, and State of Texas, has invented certain new and useful Improvements in a Plunger for Baling Machines, of which the following is a specification.

This invention relates to new and useful improvements in a plunger for baling machines, and has particular relation to a form of plunger having a detachable head, which, when in operation, forms the head of the plunger.

One object of the invention is to provide a detachable block of the character described forming the plunger head when the plunger is in operation, but which is detached from the plunger upon the completion of the bale, and held against the bale end, said block being provided with transverse tracks or grooves, through which the wire carrying means operate in carrying the wire around the end of the bale for tying. In some forms of hay baling machines, needles are employed to carry the wires around the bale, and in other forms, shuttles are employed for this purpose. This device is designed to be used in connection with any form of hay baling presses, whether needles, shuttles or other wire carrying means are employed.

Another object of the invention is to provide a head of the character described having transverse tracks or grooves through which the wire carrying means operate, and whereby the hay or other material is held out of the way, so as to provide a clear passageway for the wire carrying means.

A further feature of the invention resides in the provision of a device of the character described which is simple in construction and operation, and which will be cheap to manufacture, and easily applied to the ordinary form of hay press.

With the above and other objects in view, the invention has particular relation to certain novel features of construction, operation and arrangement of parts, an example of which is given in this specification and illustrated in the accompanying drawings, wherein:

Figure 1, is a transverse sectional view of the device, shown connected to the plunger of a baling press.

Figure 2, is a transverse sectional view thereof, shown disconnected from the plunger.

Figure 3, is a side elevation thereof.

Figure 4, is a side elevation of the plunger showing the block attached thereto, and Figure 5, is an end view of said head.

Referring now more particularly to the drawings, wherein like numerals of reference designate similar parts in each of the figures, the numeral 1, designates the baling chamber of the hay baling press, and the numeral 2, refers to the tying chamber, which is, in effect, a continuation of said baling chamber. Within the baling chamber, there is the plunger 3, which is reciprocated back and forth, by means of the connecting rod 4, in the well known manner. The numeral 5, refers to a head which is fitted against the working end of the plunger 3, and which is normally held connected thereto by means of opposing dogs 6, 6, which are pivoted to said block and which engage with the corresponding shoulders 7, 7, carried by the plunger 3. These dogs are held in engagement with said shoulders by means of the push springs 8, 8, which are seated in recesses in the block 5, and press against the extensions 9, 9, of the corresponding dogs 6. The head 5 carries an apron 10 which extends rearwardly therefrom, and covers the top and sides of the plunger when the block is attached to the plunger, but upon the completion of the bale, and when the tying operation is taking place, and the plunger is detached from said head, as hereinafter explained, and withdrawn, this apron operates to close the feed inlet of the hay baling press and stop the delivery of material into the baling chamber.

The head 5 is provided with the laterally extending tracks or grooves 11, 11, which are spaced the required distance apart and which are provided to permit the passageway of the needles, shuttles, or other wire carrying means therethrough, to carry the wire around the end of the completed bale. Pivoted to the sides of the tying chamber, are the opposing dogs 12, 12, and mounted in suitable bearings carried by the sides of said chamber, are the vertical rods 13, 13, having the off set portions 14, 14. The lower ends of these rods have the arms 15, to the free ends of which the respective ends of the link 16 are pivoted, and the upper end of one of the rods 13 has the handle 17. The dogs 12 are arranged to play through opposing slots 18, 18, cut through the sides of the baling chamber and are normally held withdrawn from said slots by the off set portions 14 of the rods 13, as illustrated in Figure 1.

During the formation of the bale, the dogs 12 are held in withdrawn position as illustrated and the head 5 moves back and forth with the plunger to compress the bale in the tying chamber. When the bale is completed, the handle 17 is manipulated to turn the corresponding rod 13, which will operate through the link 16, to turn the other rod 13, thus carrying the off set portions 14, 14, out of contact with the dogs 12, and thereupon the springs 19, 19, which are interposed between the sides of the tying chamber and the extensions 20, 20, of said dogs, operate to project the dogs 12 through the slots 18, and against the extensions 9, of the dogs 6, thereby releasing said dogs 6, from the shoulders 7, and simultaneously engaging against the shoulders 21, of the head 5. The head is thus firmly held by the dogs 12, against the bale while the plunger is released and moves backwardly on its back stroke during the tying operation. When the wires have been tied, the handle 17 is again manipulated to withdraw the dogs 12, from the slots 18, and as the plunger moves forwardly into contact with the head 5, the dogs 6 again engage and secure said head to the plunger as before, and it thereafter moves with said plunger in the formation of the next succeeding bale, and until it is again released, as hereinbefore explained.

What I claim is:

1. In a bale forming machine, a plunger whose operative end is formed with a detachable head, and means for detaching said head from said plunger, and means through which said head is automatically reconnected to the plunger.

2. In a baling machine, a plunger whose operative end is formed with a detachable head, having transverse grooves therethrough, releasable means securing said head to said plunger, and means through which the head, after being released from the plunger, may be automatically reconnected to said plunger.

3. In a bale forming machine, a plunger, a detachable head, having a transverse groove therethrough, and forming the operative end of said plunger, releasable means through which said head is normally secured to said plunger and means for releasing said head from said plunger, said releasable means normally operating to re-connect said head to said plunger.

4. In a baling machine, a plunger, a head forming the operative end of the plunger, an integral apron forming an extension of said head and inclosing the top and sides of the plunger when the head is connected thereto, and releasable means detachably securing said head to said plunger.

5. In a baling machine, a reciprocating plunger, a head detachably secured to the operative end of said plunger and having a plurality of transverse grooves therethrough, forming tracks for the passageway of wire carrying means, an extension carried by said head and covering the top and sides of said plunger and releasable means securing said head to the plunger.

In testimony whereof he has signed his name to this specification in the presence of two subscribing witnesses.

WALTER F. MOTTIER.

Witnesses:
IRENE I. BRUNS,
WM. A. CATHEY.